US005499941A

United States Patent [19]

Penjuke, Sr.

[11] Patent Number: 5,499,941
[45] Date of Patent: Mar. 19, 1996

[54] BALLOON INFLATION DEVICE WITH LIGHT

[76] Inventor: Daniel T. Penjuke, Sr., 64 Albert Ave., Aldan, Pa. 19018

[21] Appl. No.: 320,856

[22] Filed: Oct. 11, 1994

[51] Int. Cl.$^6$ .................... A63H 27/10; B60C 29/00

[52] U.S. Cl. .................... 446/222; 446/484; 137/560; 137/853

[58] Field of Search .................... 446/222, 224, 446/220, 484, 485; 137/560, 853; 251/148

[56] References Cited

U.S. PATENT DOCUMENTS

| | | | |
|---|---|---|---|
| 1,530,923 | 3/1925 | Anns | 446/224 |
| 3,410,299 | 11/1968 | Whittington | 446/222 X |
| 4,292,999 | 10/1981 | Szollmann | 137/560 |
| 4,542,445 | 9/1985 | Marletta | 446/224 X |
| 4,586,910 | 5/1986 | Buchanan | 446/220 |
| 4,687,458 | 8/1987 | Handa | 446/222 |
| 4,736,281 | 4/1988 | Neumeier | 446/220 X |
| 4,794,498 | 12/1988 | Neumeier | 362/186 |
| 4,997,403 | 3/1991 | Akman | 446/220 |
| 5,083,250 | 1/1992 | Malcolm | 362/253 |

FOREIGN PATENT DOCUMENTS

| | | | |
|---|---|---|---|
| 137847 | 6/1993 | Japan | 446/220 |

*Primary Examiner*—Mickey Yu
*Attorney, Agent, or Firm*—Robert S. Lipton; Lipton & Stapler

[57] ABSTRACT

A balloon inflation device with a light source involving a tube with internal electrical conducting wire such that a power source can be attached to one end of the tube, a light bulb can be attached to the other end of the tube and the power source will illuminate the light bulb. The tube also has a radially projecting flange with a chamfered edge on its outer surface such that the tube can be inserted into a balloon, light first, and the stem of the balloon can be stretched over the flange, holding the tube in place and creating a mechanical seal that prevents gas from passing between the flange and the balloon stem. The power source of the light bulb can be removed from the tube and a gas stream can be projected into the balloon, inflating it, but the tube is arranged and configured such that the gas in the balloon cannot flow out of the balloon through the tube.

9 Claims, 3 Drawing Sheets

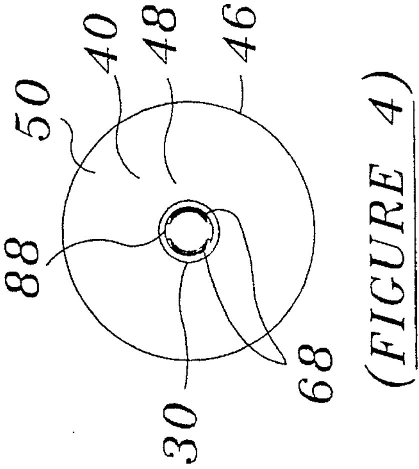
(FIGURE 4)
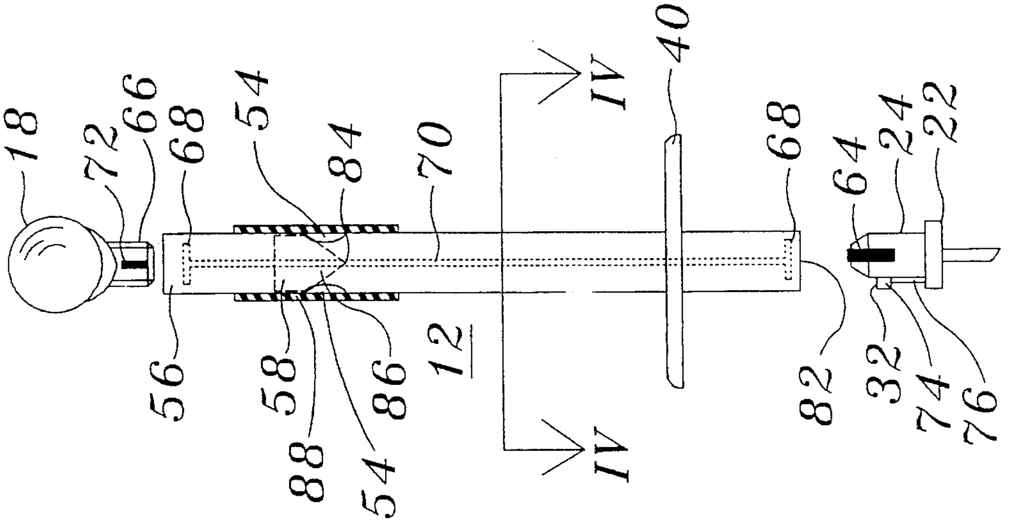
FIGURE 3
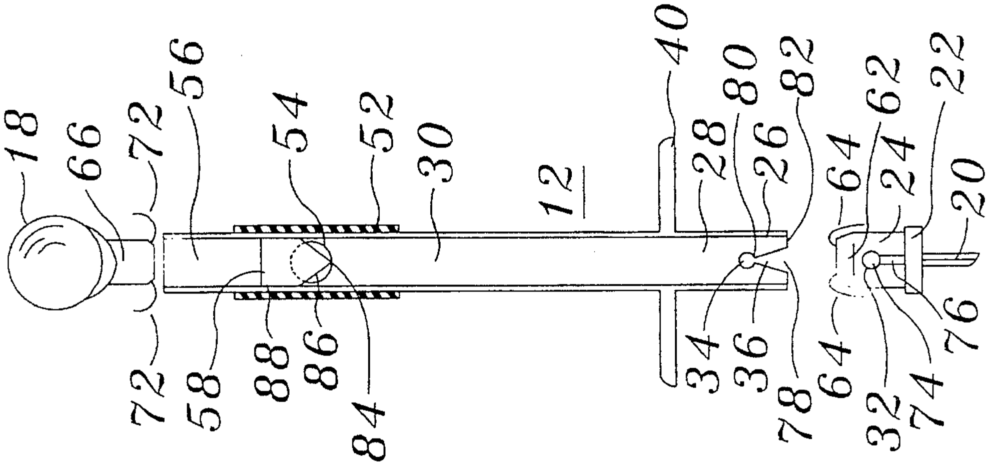
FIGURE 2

BALLOON INFLATION DEVICE WITH LIGHT

BACKGROUND OF THE INVENTION

The present invention relates to a device for inflating a balloon, the device being inserted into the balloon through the balloon stem and the device being mechanically sealed to the balloon. Further, one end of the device extends into the balloon and on this end is attached a light to illuminate the balloon from its interior. In particular, the present invention permits repeated inflations of the balloon without removal of the inflation device.

It has been proposed to use an internal light in balloons for illumination purposes. Either singly or in arrangements, internally illuminated balloons are attractive and therefore desired by numerous people. Uses of illuminated balloons range from novelty items at fairs and circuses to arrangements placed outside during evening events.

However, the prior art is lacking as to a number of areas concerning illumination devices for balloons. A number of designs for an illuminated balloon requires the power source to be directly attached to the balloon, specifically, the balloon must carry a battery. This arrangement limits the time the balloon can be illuminated and weighs down the balloon. Another type of design requires the balloon to first be inflated and then the light source is inserted into the balloon. This arrangement does not allow for the balloon to be reinflated without first removing the light source and partially or entirely deflating the balloon. Another type of design allows for the balloon to be reinflated with the light source remaining in the balloon, however, the balloon cannot be readily moved as the reinflation apparatus is bulky. Another design allows for a light to be incorporated into a balloon inflation plug but, the plug interferes with the even illumination of the balloon.

SUMMARY OF THE INVENTION

Accordingly, it is the object of the present invention to provide a device to inflate and illuminate balloons which overcome one or more of the problems in the prior art.

The subject invention more specifically relates to a balloon inflation device with a light source involving a tube with internal electrical conducting wire such that a power source can be attached to one end of the tube, a light bulb can be attached to the other end of the tube and the power source will illuminate the light bulb. The tube also has a radially projecting flange ,with a chamfered edge on its outer surface such that the tube can be inserted into a balloon, light first, and the stem of the balloon can be stretched over the flange, holding the tube in place and creating a mechanical seal that prevents gas from passing between the flange and the balloon stem. The power source of the light bulb can be removed from the tube and a gas stream can be projected into the balloon, inflating it, but the tube is arranged and configured such that the gas in the balloon cannot flow out of the balloon through the tube.

It is, therefore, a primary object of the subject invention to provide a light source that can be used conveniently to inflate a balloon.

Another object of the subject invention is that the inflated balloon with the internal light source can be attached easily to a power source.

It is also an object of the present invention to provide an improved mechanical seal between the stem of the balloon and the light source.

It is another object of the present invention to provide a device that conveniently allows a balloon to be reinflated without partially or fully deflating the balloon.

Still another object of the present invention is to provide a device that allows balloons with illumination to be easily switched among power sources without deflating balloons.

Other objects and advantages of the present invention will be apparent upon reference to the accompanying description when taken in conjunction with the following drawings.

BRIEF DESCRIPTION OF THE DRAWINGS

For further details, reference is made to the discussion which follows, in light of the accompanying drawings, wherein:

FIG. 2 shows an exploded front elevation of the light source;

FIG. 3 shows an exploded side elevation of the light source;

FIG. 4 shows a section of the light source;

DETAILED DESCRIPTION OF THE PREFERRED EMBODIMENT

Figure 1:
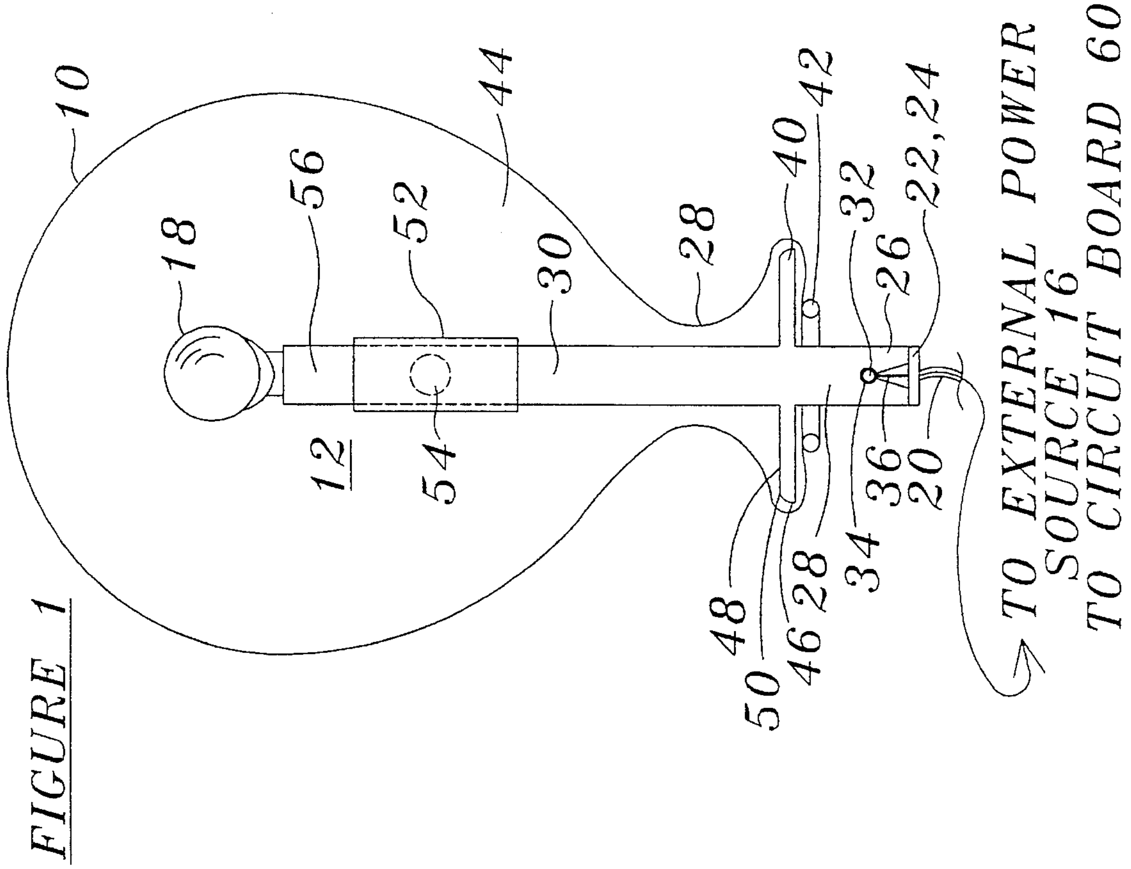
FIG. 1 shows an elevation of an arrangement of a balloon with a light source characteristic of the invention.

Referring now to FIG. 1, an inflated balloon 10 with a light source 12 inserted therein is shown. The power to illuminate the light bulb 18 is being delivered from an external power source 16. The external power source 16 may be a wide variety of types the prerequisite being the proper voltage of electricity, either in direct or alternating current.

Still referring to FIG. 1, the electrical current to illuminate the light bulb 18 is delivered via a two wire conductor 20 to a base 22 of a male plug 24. Male plug 24 is inserted into a female receptacle 26 located at a open end 28 of a tube 30. Male plug 24 is being held snugly up to its base 22 in female receptacle 26 by key 32 snapped into circular hole 34 of key way 36. Alternative embodiments of the invention may include more than one key 32/key way 36 assembly (not shown). See FIGS. 2 and 3 for details of the key 32/key way 36 assembly.

Still referring to FIG. 1, balloon 10 is held in place by the mechanical seal created when a stem 38 of the balloon 10 is stretched over flange 40 after light source 12 is inserted into balloon 10, light bulb 18 first. Flange 40, which is located near open end 28, protrudes radially from tube 30. To attach balloon stem 38 to flange 40, balloon bead 42 is stretched over an outside edge 46 of flange 40, thereby forming a seal to hold balloon 10 in place while preventing a gas 44 from exiting balloon 10.

Still referring to FIG. 1, the seal formed by balloon stem 38 and outside edge 46 is further strengthened by the increased surface of the seal created by chamfer 50 on flange 40. Chamfer 50 is located where outside edge 46 of flange 40 abuts a face 48 of flange 40. Face 48 is the surface of flange 40 that is oriented towards light bulb 18. Without chamfer 50, the only balloon 10/flange 40 contact creating the mechanical seal would be along thin, outside edge 46 (not shown). With chamfer 50, as shown in FIG. 1, balloon stem 38 lies not only on edge 38, but on a significant part of chamfer 50 as well. This increased interface between the balloon 10 and flange 40 increases the effectiveness of the mechanical seal.

Still referring to FIG. 1, an elastic band 52 prevents gas 44 from exiting balloon 10 through a pair of holes 54 (only one hole 54 is shown) in tube 30. Holes 54 are located opposite each other in tube 30 and between flange 40 and light bulb 18. Elastic band 52 fits snugly around a portion of tube 30, completely covering holes 54. Not only does the elastic tension of elastic band 52 create a gas-tight seal that prevents gas 44 from exiting balloon 10 by passing between band 52 and tube 30 and out through holes 54, the pressure of gas 44 further seals the band around the edge of holes 54. See FIG. 6 for details.

Still referring to FIG. 1, elastic band 52 not only prevents gas 44 from exiting balloon 10, but operates as a one-way valve during the balloon 14 inflation process. See description of FIG. 5 for details of inflation process.

Still referring to FIG. 1, light bulb 18 is located at the sealed end 56 of tube 30. End 56 is sealed to prevent gas 44 from existing balloon 10 therethrough. A conical plug 58 is used to seal the end of tube 30 (see FIGS. 2 and 3). Light bulb 18 is preferably a 1.5 to 3 volt incandescent bulb. Tube 30 can be fabricated to be longer or shorter in order to accommodate different size balloons. One embodiment of the invention also permits light bulb 18 to flash in a pattern by the use of a pre-programmed circuit board 60. Another embodiment of the invention permits tow or more balloons to be operated by a single preprogrammed circuit 60, thus allowing a group of balloons to flash in a predetermined pattern.

Now referring to FIGS. 2 and 3, light source is shown in an exploded view with light bulb 18 and male plug 24 separated from tube 30. Light bulb 18 has a base 66 with two electrodes 72 protruding from base 66. Base 66 is inserted into sealed end 56. Base 66 maintains its position in sealed end 56 through the frictional force between base 66 and the interior surface 88 tube 30 (see FIG. 4).

Focusing on male plug 24 in FIGS. 2 and 3, a two wire conductor 20 enters male plug 24 through bottom of base 22. The bottom of male plug 24 rests on the top of base 22. Male plug 30 is substantially cylindrical in shape, with its longitudinal axis coexistent with the longitudinal axis of base 22 (which is also substantially cylindrical). The radius of base 22 is substantially equal to the radius of male plug 24 plus the wall thickness of tube 30. The top of male plug 24 has a chamfer 62 to ease entry into open end of tube 30. The diameter of male plug 24 is only slightly smaller than the interior diameter of tube 30 to enable the frictional force between the side wall of male plug 24 and the interior surface 88 to hold plug 24 in position after insertion into tube 30.

Still referring to FIGS. 2 and 3, male plug 24 is also held in position in light source 12 by key 32/key way 36 assembly. FIGS. 2 and 3 show a front view and a side view of key 32 respectively. Key 32 projects radially from the side of male plug 24 substantially a distance equal to the thickness of the wall of tube 30. Key 32 comprises two parts, a cylindrical projection 74 and post projection 76. Post projection 76 extends between cylindrical projection 74 and base 22 and is normal to base 22. Post projection 76 braces cylindrical projection 74 so as to aid in preventing cylindrical projection 74 from being either distressed, disfigured, or shorn off during handling of male plug 24.

Still referring to FIGS. 2 and 3, key way 36 extends through the wall of tube 30 and is comprised of an equilateral triangular hole 78 and a circular hole 34. The base of equilateral triangular hole 78 is aligned with a edge 82 of open end 28. Circular hole 34 intersects the apex of triangular hole 78. A gap 80 exists at the intersection of hole 34 and 78. Gap 80 is of a dimension such that cylindrical projection 74 can pass snugly through gap 80 while width of post projection is narrower than gap 80 is wide. Circular hole 34 is dimensioned to accommodate cylindrical projection 74. Key 32/key way 36 assembly is constructed and arranged such that when male plug 24 is inserted into female receptacle 26 and key 32 is aligned with key way 36, cylindrical projection 74 snaps through gap 80, fits snugly in circular hole 34, and base 22 rests against edge 82 of tube 30.

Still referring to FIGS. 2 and 3, electrodes 64 of two wire conductor 20 pierce base 22 and plug 24, protrude out the top of plug 24, bend toward base 22 and away from each other, and conform to chamfer 62 and the side of plug 24. Male plug 24 is inserted into female receptacle 26 of open end 28 such that each electrode 64 contacts a conducting wire 70, respectively. Each light source 12 has two conducting wires 70. Each conducting wire 70 is attached to the interior surface 88 and extends substantially from open end 28 to sealed end 56. Each conducting wire traverses the portion of the interior surface 88 between holes 54, respectfully. Each wire 70 has two T-shaped terminal ends 68 to ensure contact of the conducting wire to electrodes 64 when male plug 24 is inserted into female receptacle 26 and to electrodes 72 when light bulb 18 is inserted into sealed end 56.

Still referring to FIGS. 2 and 3, a conical plug 58 seals sealed end 56 of tube 30. Conical plug 58 comprises a point 84, a conical surface 86 surrounding point 84, and a cylindrical surface 88 abutting the base of conical surface 86. Cylindrical surface 88 is substantially the same circumference as the interior surface 88. When conical plug 58 is inserted into tube 30 to seal sealed end 56, the cylindrical surface 86 is attached snugly to the interior surface 88, forming an air-tight seal. Conical plug 58 is positioned in tube 30 such that point 84 is directed towards open end 28 and conical surface 86 can deflect gas flow 100 towards holes 54 (see FIG. 5). When elastic band 52 is not covering holes 54, conical surface 86 and point 84 are visible though holes 54.

Now referring to FIG. 4, a top view of section IV from FIG. 3, flange 40 circumscribes tube 30 while chamfer 50 circumscribes flange 40. Tube 30 is centrally located in flange 40. T-shaped terminal ends 68 are on interior surface 88 of tube 30.

Figure 5:
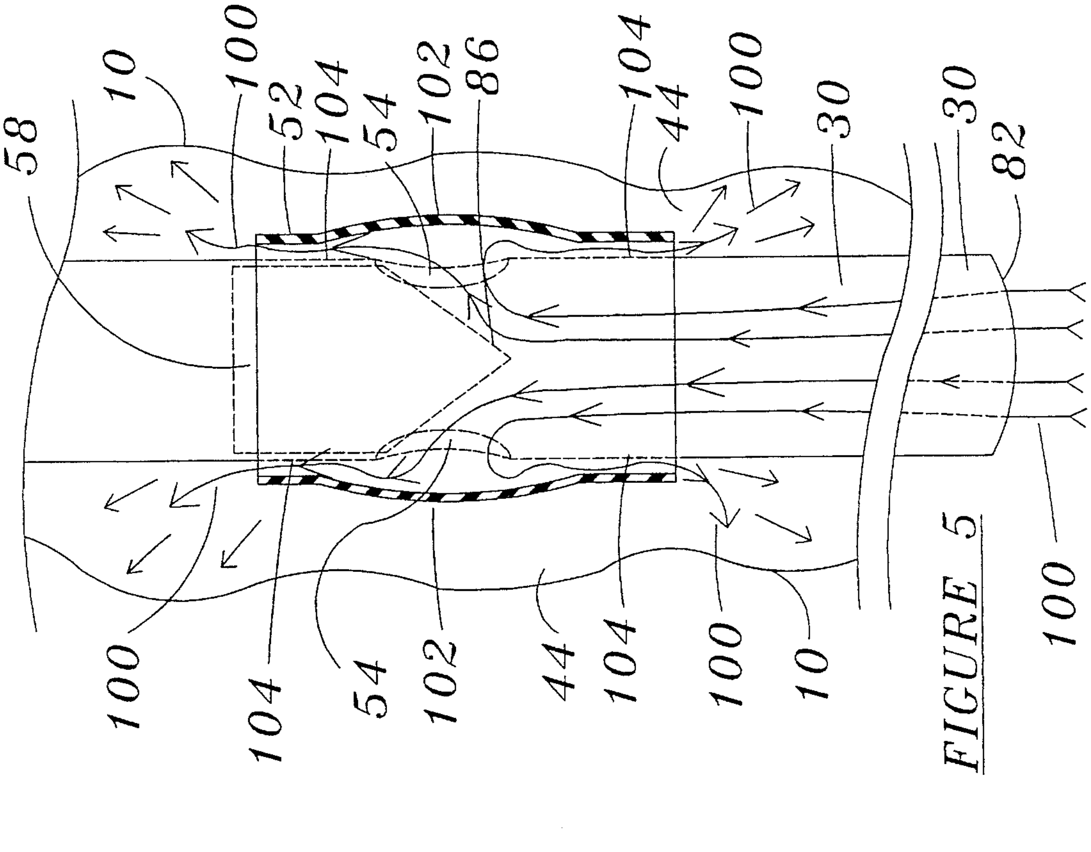
FIG. 5 shows air flow through a section of the light source to inflate a balloon.

Now referring now to FIG. 5, an air path 100 shows gas 44's path though tube 30 to inflate balloon 10. Balloon 10 has a withered appearance because it is not inflated. Air path 100 enters tube 30 through open end 28, moves through tube 30 until deflected to holes 54 by conical surface 86 of conical plug 58. The pressure of air path 100 on the portion 102 of elastic band 52 that covers holes 54 causes portion 102 to expand away from holes 54. When the pressure of air path 100 is great enough, gas 44 exits tube 30 by forcing one or more openings 104 between elastic band 52 and tube 30. In FIG. 5, four openings 104 are shown. When the openings 104 are formed, gas 44 flows into balloon 10, thus balloon 10 is inflated. After balloon 10 is inflated to the desired size, the air flow 100 is halted. At this point, male plug 24 can be inserted in female receptacle 26 in order to send power to light bulb 18 of light source 12 residing in inflated balloon 10.

Figure 6:
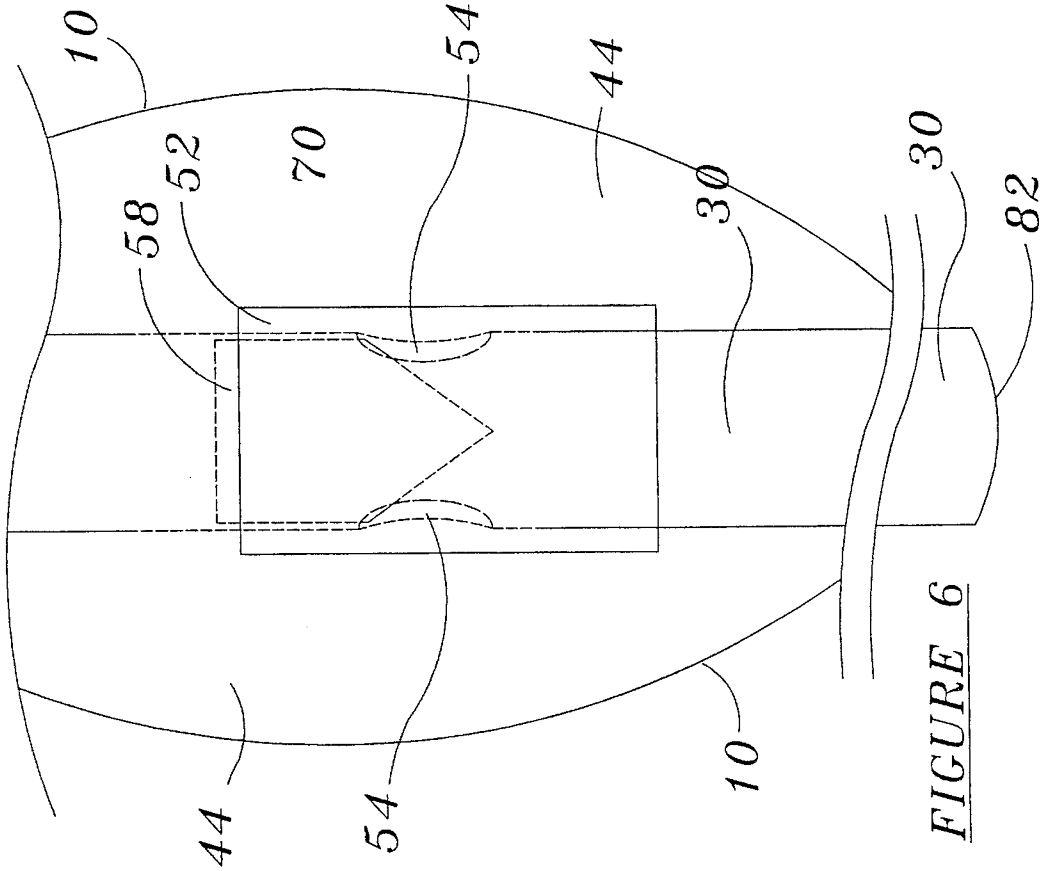
FIG. 6 shows a section of the light source preventing gas from leaving an inflated balloon.

Now referring to FIG. 6, balloon 10 is fully inflated and air stream 100 is no longer present. Under these conditions, gas 44 in balloon 10 exerts pressure on the outside of elastic band 52. This condition seals elastic band 52 to tube 30, thereby preventing gas 44 from traveling from balloon 10, between elastic band 52 and tube, and through holes 54. Further, portion 102 of elastic band 52 takes on a concave shape due to the pressure of gas 44 on it. These concavities help to further seal holes 54 from gas 44 leaks.

Figure 7:
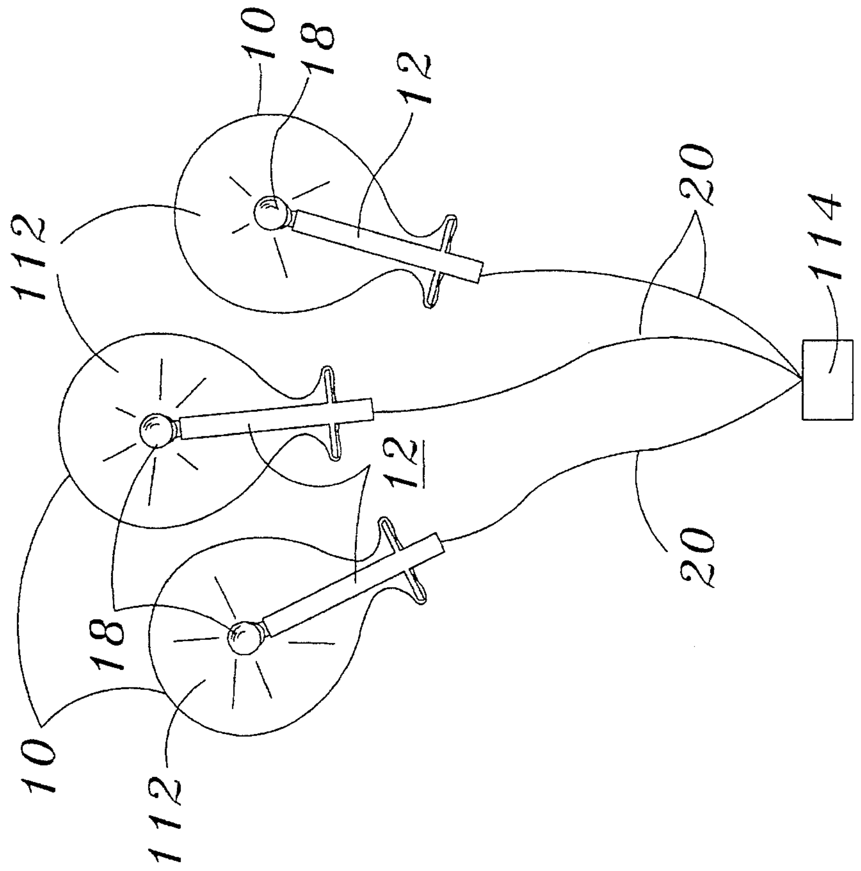
FIG. 7 shows an embodiment of the invention comprising a group of inflated balloons with light sources.

Now referring to FIG. 7, an embodiment 110 of the invention is shown comprising three balloons 10, inflated with a lighter than air gas 112, such as helium. A light source 12 is in each balloon 10, the light source 12 being of a weight such that balloons 10 can float. Each light source 12 is powered by a battery pack 114 through a two wire conductor 20, respectively. In other embodiments, the power source is a standard electrical outlet. Also, other embodiments have more or less balloons. Further, other embodiments have a circuit board to create a flashing pattern of illuminated balloons.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed is:

1. A device for inflating purposes comprising:

a tube with an open end, a sealing means sealing the other end, a wall having an exterior surface, and two holes, the holes positioned latitudinally opposite each other in the wall;

an annular flange projecting from the exterior surface, extending radially outward, located between the holes and the open end, having an outside edge, a surface facing the sealed end of the tube, and a chamfered corner located where the outside edge abuts the surface facing the sealed end of the tube, the sealing means comprising a conical plug, with a point and a conical surface, positioned in the tube such that the point is directed towards the open end of the tube and the conical surface deflects gas entering the tube to the holes, thereby facilitating the gas's exit from the tube;

elastic means on the exterior surface, covering the holes, arranged and configured such that gas cannot enter the tube via the holes in the wall and, when a gas enters the tube from the open end, the elastic means prevents the gas from exiting the tube through the holes until the force of the gas in the tube exceeds the force of the elastic material whereupon the gas exits the tube by traveling first through the holes and then between the elastic material and the exterior surface of the tube;

a light bulb engaged with the sealed end of the tube;

an electrical junction with a first-half attached to the open end of the tube and a second-half locked to the first-half by a locking means that withstands axial tension;

a first electrical conducting means to deliver electrical current from the first-half of the electrical junction to the light bulb; and a second electrical conducting means adapted to connect to a power source to deliver electrical current to the second-half of the electrical junction.

2. The device for inflating purposes of claim 1 wherein the elastic means comprises a band of rubber-like material that fits snugly on the exterior surface and covers the two holes.

3. The device for inflating purposes of claim 2 wherein the first-half of the electrical junction is a female receptacle;

the second half of the electrical junction is a male plug;

the first electrical conducting means comprises two electrical connections on the interior surface of the tube, with "T"-shaped ends, and each electrical connection traversing a section of the interior surface between the two holes, respectively; and the locking means comprises a key projecting a distance substantially equal to the thickness of the tube wall from a side of the male plug, and, as viewed into the projection thereof with the insertion end of the male plug oriented up, the shape thereof is that of a circle on a post;

a key way through the tube wall, and, as viewed into the tube wall with the open end of the tube oriented down, the shape thereof of a substantially equilateral triangle having a base aligned with the open end of the tube and an apex topped by a circular hole slightly larger than the circle of the key; and the key and the key way constructed and arranged such that when the male plug is inserted into the female receptacle, the key is aligned with the key way and circle of the key snaps into the circular hole of the key way.

4. The device for inflating purposes of claim 3 wherein the power source is a battery and the delivery of power from the battery to the light bulb is controlled by a circuit board.

5. A balloon assembly comprising a balloon;

a device for inflating purposes comprising a tube with an open end, a sealing means sealing the other end, a wall having an exterior surface, an interior surface and two holes, the holes positioned latitudinally opposite each other in the wall; an annular flange projecting from the exterior surface, extending radially outward, located between the holes and the open end; the annular flange having an outside edge, a surface facing the sealed end of the tube, and a chamfered corner located where the outside edge abuts the surface facing the sealed end of the tube, the sealing means comprising a conical plug, with a point and a conical surface, positioned in the tube such that the point is directed towards the open end of the tube and the conical surface deflects gas entering the tube to the holes, thereby facilitating the gas's exit from the tube;

elastic means on the exterior surface, covering the holes, arranged and configured such that gas cannot enter the tube via the holes in the wall and, when a gas enters the tube from the open end, the elastic means prevents the gas from exiting the tube through the holes until the force of the gas in the tube exceeds the force of the elastic material whereupon the gas exits the tube by traveling first through the holes and then between the elastic material and the exterior surface of the tube;

a stretchable stem of the balloon stretched over the annular flange to mechanically secure the device for inflating purposes to the stretchable stem, the device for inflating purposes being oriented such that the open end of the tube extends away from the balloon;

a light bulb engaged with the sealed end of the tube;

an electrical junction with a first-half attached to the open end of the tube and a second-half locked to the first-half by a locking means that withstands axial tension;

a first electrical conducting means to deliver electrical current from the first-half of the electrical junction to the light bulb; and a second electrical conducting means adapted to deliver electrical current from a power source to the second-half of the electrical junction.

6. The balloon assembly of claim 5 wherein the elastic means comprises a band of rubber-like material that fits snugly on the exterior surface and covers the two holes.

7. The balloon assembly of claim 6 wherein the first-half of the electrical junction is a female receptacle;

the second half of the electrical junction is a male plug;

the first electrical conducting means comprises two electrical connections on the interior surface of the tube, with "T"-shaped ends, and each electrical connection traversing a section of the interior surface between the two holes, respectively; and the locking means comprises a key projecting a distance substantially equal to the thickness of the tube wall from a side of the male plug, and, as viewed into the projection thereof with the insertion end of the male plug oriented up, the shape thereof is that of a circle on a post;

a key way through the tube wall, and, as viewed into the tube wall with the open end of the tube oriented down, the shape thereof of a substantially equilateral triangle having a base aligned with the open end of the tube and an apex topped by a circular hole slightly larger than the circle of the key; and the key and the key way constructed and arranged such that when the male plug is inserted into the female receptacle, the key is aligned with the key way and circle of the key snaps into the circular hole of the key way.

8. The balloon assembly of claim 7 wherein the power source is a battery and the delivery of power from the battery to the light bulb is controlled by a circuit board.

9. The balloon assembly of claim 8 further comprising an arrangement of 2 or more balloons and each balloon contains one device for inflating purposes.

* * * * *